(12) United States Patent
Behrends, III et al.

(10) Patent No.: US 11,858,764 B1
(45) Date of Patent: Jan. 2, 2024

(54) MATERIAL MOVEMENT APPARATUS AND METHOD

(71) Applicants: William Harold Behrends, III, Cantonment, FL (US); Eddy Jay Bledsoe, Cantonment, FL (US)

(72) Inventors: William Harold Behrends, III, Cantonment, FL (US); Eddy Jay Bledsoe, Cantonment, FL (US)

( * ) Notice: Subject to any disclaimer, the term of this patent is extended or adjusted under 35 U.S.C. 154(b) by 153 days.

(21) Appl. No.: 17/499,957

(22) Filed: Oct. 13, 2021

Related U.S. Application Data

(60) Provisional application No. 63/092,505, filed on Oct. 15, 2020.

(51) Int. Cl.
  *B65G 7/12* (2006.01)
  *B62B 15/00* (2020.01)

(52) U.S. Cl.
  CPC .............. *B65G 7/12* (2013.01); *B62B 15/007* (2013.01)

(58) Field of Classification Search
  CPC ....... B62B 15/007; B65G 7/12; B65F 1/0006; B65F 2240/138; A01G 20/43; A61G 1/01; A61G 5/625; A61G 5/626; A01M 31/006
  USPC .................................................. 294/15, 156
  See application file for complete search history.

(56) References Cited

U.S. PATENT DOCUMENTS

| | | | | |
|---|---|---|---|---|
| 2,397,433 A * | 3/1946 | Reeves | ..................... | A45F 5/10 16/114.1 |
| 3,547,456 A * | 12/1970 | Sapp | ..................... | A01M 31/00 280/19 |
| 4,046,393 A * | 9/1977 | Vadnais | ................. | B62B 15/007 280/24 |
| 4,335,891 A * | 6/1982 | Alley | ..................... | B62B 15/00 280/28.11 |
| 5,660,402 A * | 8/1997 | Jones | ..................... | B65F 1/1468 280/19 |
| 9,422,107 B1 * | 8/2016 | Sigety | .................. | B65F 1/0006 |
| 2019/0016529 A1 * | 1/2019 | Grace | .................. | B65F 1/1415 |

* cited by examiner

*Primary Examiner* — Dean J Kramer
(74) *Attorney, Agent, or Firm* — J. Nevin Shaffer, Jr.

(57) ABSTRACT

A material movement apparatus and method includes a material support with a front, a rear, a first side, a second side, a top and a bottom where the front includes a curved section that curves up from the bottom from the first side to the second side. A pull bar is connected with the top at the front within the front curved section, a pull point is connected with the pull bar from the bottom and a handle is located in one side.

20 Claims, 3 Drawing Sheets

MATERIAL MOVEMENT APPARATUS AND METHOD

CROSS REFERENCE TO RELATED APPLICATION

This application claims the benefit of previously filed U.S. provisional patent application No. 63/092,505 filed Oct. 15, 2020 for a "Lightweight and flexible and impact resistant and weather resistant and UV resistant and chemical resistant apparatus with a very low coefficient of friction for holding and transporting and depositing materials with transport by way of an external pulling force". The Applicants hereby claim the benefit of this provisional application under 35 U.S.C. § 119. The entire content of this provisional application is incorporated herein by this reference.

FIELD OF THE INVENTION

This invention relates to a material movement apparatus and method. In particular, in accordance with one embodiment, the invention relates to a material movement apparatus including a material support with a front, a rear, a first side, a second side, a top and a bottom where the front includes a curved section that curves up from the bottom from the first side to the second side. A pull bar is connected with the top at the front within the front curved section, a pull point is connected with the pull bar from the bottom and a handle is located in one side.

BACKGROUND OF THE INVENTION

A problem exists with regard to the issue of moving material from one place to another. By way of example only and not by limitation, a variety of outdoor equipment is available for moving material by means of wheeled devices. Devices with wheels and axles, however, are limited in usefulness due to axle clearances, loading surfaces must be suitable for wheeled devices and the devices are naturally elevated above the surface from which the material to be moved must be gathered. That is to say, not all wheeled material movement devices are suitable for use with various loads and surfaces. For instance, a wheeled device may work well for heavy loads on a hard surface but fails on soft or shifting surfaces like sand or mud.

Further, hard tires create excessive bounce, narrow tires create ruts and sink into soft surfaces, wide tires are heavy and difficult to turn. Still further, wheeled equipment and the other parts associated with such devices are subject to increased wear and tear and failure during normal use.

The prior art includes non-wheeled alternatives. Hundreds of years ago, or more, farmers used a tool called a "Stone Boat" to transport materials without wheels. Stone boats used large, heavy planks of wood and heavy metal connecting brackets. More recently, other devices, such as tarps and metal sheets have been used. However, tarps tear easily and metal sheets are too heavy for practical use in most situations. The Applicants are aware of non-wheeled alternatives made of plastic but each of the prior art plastic devices suffer from one or more defects. Some are too light weight, some are too heavy, for example, and none are designed to equally distribute force applied to them to prevent rupture and degradation of, and around, the pull points used for moving the device. Further, prior art devices are prone to dig into the surface which slows movement of material and increases the incidence of debilitating damage.

Thus, there is a need in the art for, among other things, a non-wheeled, light weight, flexible, durable movement device that resists damage at pull points and which is configured such that the device does not dig into the surface as it is moved.

It therefore is an object of this invention to provide a non-wheeled, light weight, flexible, durable movement device that resists damage at pull points and which is configured such that the device does not dig into the surface as it is moved.

SUMMARY OF THE INVENTION

Accordingly, the material movement apparatus and method of the present invention, according to one embodiment, includes a material support with a front, a rear, a first side, a second side, a top and a bottom where the front includes a curved section that curves up from the bottom from the first side to the second side. A pull bar is connected with the top at the front within the front curved section, a pull point is connected with the pull bar from the bottom and a handle is located in one side.

All terms used herein are given their common meaning so that "support" identifies and describes a material that is configured to retain other items on its surface, such as a table top, for example only, supports a book. "Curved section" describes an area of the support that diverges from a flat plane and curves up and away from the flat plane as shown in the Figures, for example only.

As used herein, "pull bar" describes a bar with a length that distributes force applied to it along its length as opposed to force being applied at one or two pull points as with prior art devices.

According to another aspect, the pull point is an eyebolt connected with the pull bar from the bottom. In one aspect, the apparatus further includes more than one eyebolt connected with the pull bar from the bottom.

In one aspect, the handle is a cuttout in the side of the material. In another aspect, there is a handle in the first side and a handle in the second side and in a further aspect, there is more than one handle in the first side and in the second side.

In one aspect, the corners formed at the connection of the first side and second side with the front and rear are rounded.

In one aspect, the material support includes a tie down.

In a further aspect, the material support is a durable, low friction, flexible plastic sheet that rolls into a tubular form.

In one aspect, the apparatus further includes a second pull bar where the rear includes a rear curved section that curves up from the bottom from the first side to the second side and the second pull bar is connected with the top at the rear within the rear curved section.

According to another embodiment, a material movement apparatus consists of a material support with a front, a rear, a first side, a second side, a top and a bottom where the front includes a curved section that curves up from the bottom from the first side to the second side and where corners formed at the connection of the first side and second side with the front and rear are rounded. A pull bar is connected with the top at the front within the front curved section where the pull bar extends along the front between the first side and the second side. A pull point is connected with the pull bar from the bottom where the pull point is an eyebolt connected with the pull bar from the bottom and there is a handle in the first side and a handle in the second side.

In one aspect, the pull point is an eyebolt connected with the pull bar from the bottom.

In another aspect, the apparatus further includes more than one eyebolt connected with the pull bar from the bottom.

In one aspect, the handle is a cuttout in the side of the material and in another aspect, there is more than one handle in the first side and in the second side.

In a further aspect, the material support includes a tie down and in one aspect, there is a tie down in the first side and in the second side.

In one aspect, the material support is a durable, low friction, flexible plastic sheet that rolls into a compact tubular form for transport.

In another aspect, the apparatus further includes a second pull bar where the rear includes a rear curved section that curves up from the bottom from the first side to the second side and the second pull bar is connected with the top at the rear within the rear curved section.

According to another embodiment, a material movement method consists of
  a. providing a material support with a front, a rear, a first side, a second side, a tap and a bottom where the front includes a curved section that curves up from the bottom from the first side to the second side and where corners formed at the connection of the first side and second side with the front and rear are rounded; a pull bar connected with the top at the front within the front curved section where the pull bar extends along the front between the first side and the second side; a pull point connected with the pull bar from the bottom where the pull point is an eyebolt connected with the pull bar from the bottom and a handle in the first side and a handle in the second side; and
  b. placing the material support on the ground such that the bottom is on the ground.

In one aspect, the method further includes loading material on the top of the material support.

In another aspect, the method further includes using the pull points to move the loaded material along the ground.

In a further aspect, the method includes a second pull bar where the rear includes a rear curved section that curves up from the bottom from the first side to the second side and the second pull bar is connected with the top at the rear within the rear curved section

DESCRIPTION OF THE DRAWINGS

Other objects, features and advantages of the present invention will become more fully apparent from the following detailed description of the preferred embodiment, the appended claims and the accompanying drawings in which:

DETAILED DESCRIPTION OF THE INVENTION

Figure 1:
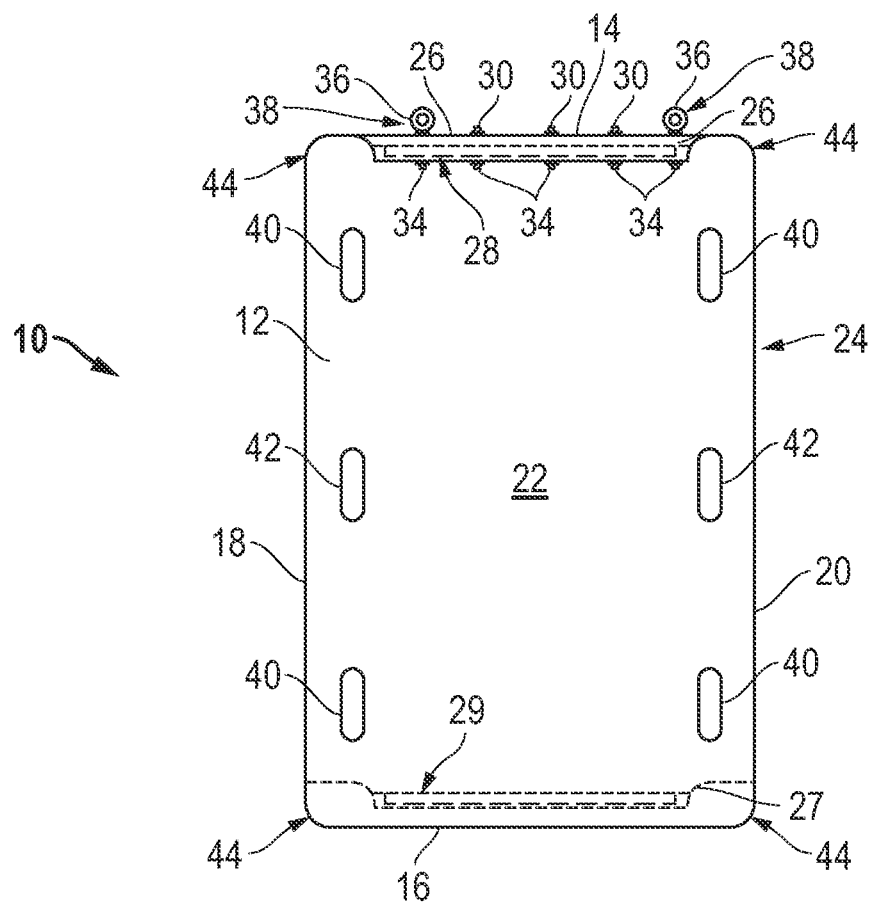
FIG. 1 is a top view of the material movement apparatus of the present invention.

Before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the invention be regarded as including equivalent constructions to those described herein insofar as they do not depart from the spirit and scope of the present invention.

For example, the specific sequence of the described method may be altered so that certain processes are conducted in parallel or independent, with other processes, to the extent that the processes are not dependent upon each other. Thus, the specific order of steps described herein is not to be considered implying a specific sequence of steps to perform the process. In alternative embodiments, one or more process steps may be implemented by a user assisted process and/or manually. Other alterations or modifications of the above processes are also contemplated.

In addition, features illustrated or described as part of one embodiment can be used on other embodiments to yield a still further embodiment. Additionally, certain features may be interchanged with similar devices or features not mentioned yet which perform the same or similar functions. It is therefore intended that such modifications and variations are included within the totality of the present invention.

It should also be noted that a plurality of hardware devices, as well as a plurality of different structural components, may be utilized to implement the invention. Furthermore, and as described in subsequent paragraphs, the specific configurations illustrated in the drawings are intended to exemplify embodiments of the invention and that other alternative configurations are possible.

A preferred embodiment of the present invention is illustrated by way of example in FIGS. 1-4. With specific reference to FIG. 1, material movement apparatus 10, according to one embodiment, includes a material support 12 with a front 14, a rear 16, a first side 18, a second side 20, a top 22 and a bottom 24. The front includes a curved section 26 that curves up from the bottom 24. The curved section 26 extends the width of material support 12 from the first side 18 to the second side 20 as illustrated.

A pull bar 28, shown in dotted lines for clarity, is connected with the top 22 at the front 14 within the front curved section 26. Preferably, front curved section 26 is heat treated and thus hardened around pull bar 28. In this manner, the front 14 and curved section 26 are strengthened and provide a superior resistance to damage when pulling force is applied. Additionally, the introduction of pull bar 28 within and along the curved section 26 acts, as will be described more fully hereafter, to distribute the applied forces along the length of the pull bar 28 and dramatically increase the amount of pulling force that can be applied while dramatically reducing the incidents of damage to the material support 12.

Figure 2:
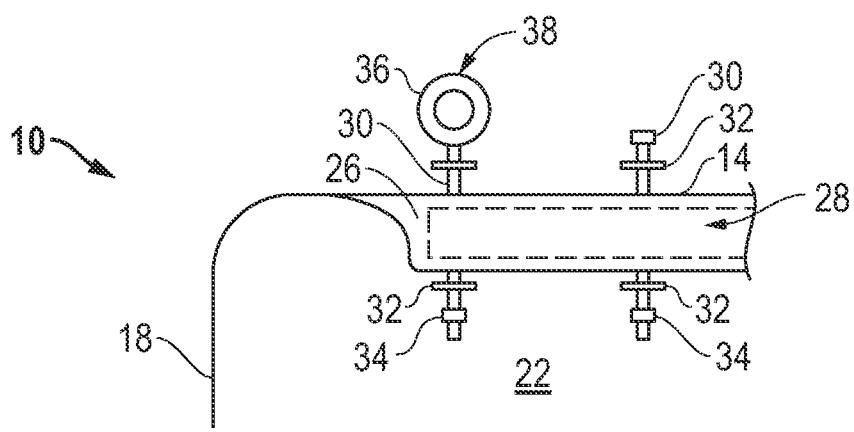
FIG. 2 is an expanded top view of the front of the invention of FIG. 1.
Figure 3:
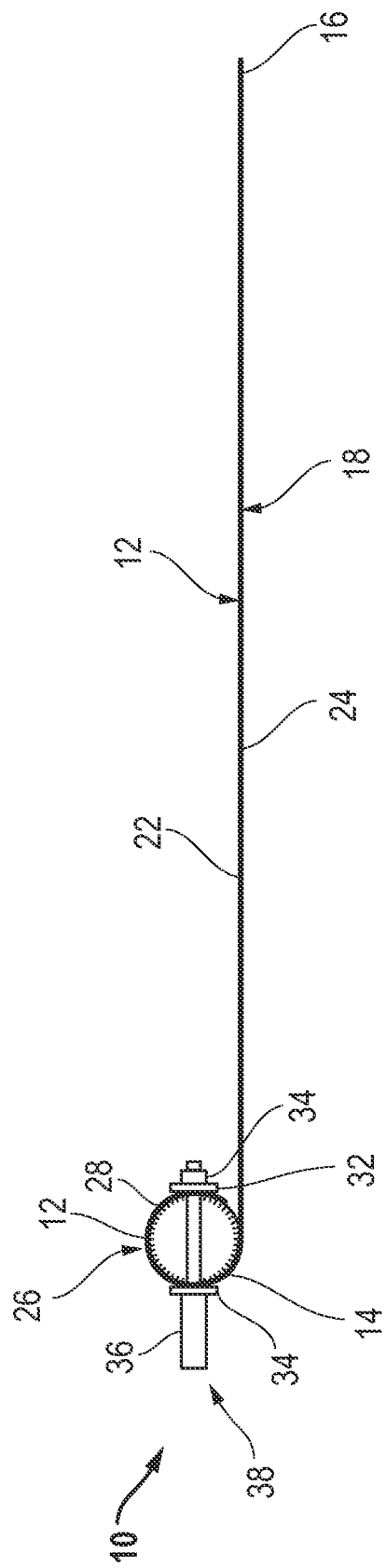
FIG. 3 is a side view of the invention of FIG. 1.

Pull bar 28 is preferably connected within the curved section 26, as more clearly shown in FIGS. 2 and 3, by means of bolts 30, washers 32 and nuts 34 but may be attached by any suitable means now known or hereafter discovered.

FIG. 1 shows in dotted lines and aspect of the invention further including a second pull bar 29 where the rear 16 includes a rear curved section 27 that curves up from the bottom 24 from the first side 18 to the second side 20 and the second pull bar 29 is connected with the top 22 at the rear 16 within the rear curved section 27. As a result, material movement apparatus 10 may be easily pulled to or from some location without having to turn it around.

In one aspect the bolt 30 may be in the form of an eyebolt 36 as shown. In this regard, the apparatus further includes a pull point 38 connected with the pull bar 28 from, through, the bottom 24 of the curved section 26, Preferably there are two pull points 38, in the form of eyebolts 36, as illustrated. Certainly any number of pull points 38 may be used for the purpose of attaching ropes, chains, wire cables or the like, for example only and not by limitation, for movement of the apparatus once material is loaded onto the top 22, surface, of material movement apparatus 10.

Further and still referring to FIG. 1, a handle 40 is located in one side of material support 12. Preferably, more than one handle 40 is provided in both the first side 18 and the second side 20 as shown. Applicants have found that forming the handle(s) 40 by cutting out openings in the material support 12 works effectively without adding weight to the apparatus nor degrading overall strength and durability.

Still further, Applicants have found that handle cuttouts also serve as tie downs 42 when needed to secure material on to material support 12.

FIG. 1 also shows an important structural element of the present invention. Preferably, the corners 44 thrilled at the connection of the first side 18 and second side 20 with the front 14 and rear 16 are rounded. This structure, Applicants have found, greatly reduces the tendency of the material support 12 to dig into the ground as it is moved along the surface. Preferably the curves of the rounded corners have a radius sufficient to eliminate a sharp point and should be the same and equidistant from the center of the apparatus.

As a result, Applicants have found that the present invention is "reversible". That is, since the structure prevents it from digging into the ground either top 22 or bottom 24 may actually contact the ground.

FIGS. 2 and 3 use the same number to describe the same elements and structure described above with regard to FIG. 1.

Figure 4:
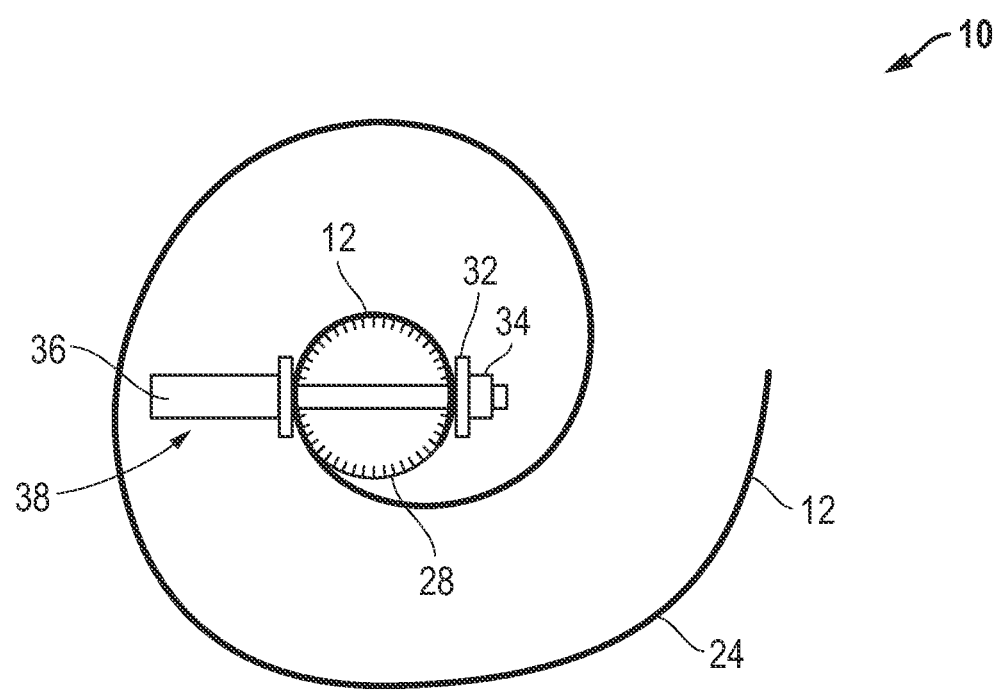
FIG. 4 is an end on view of the invention of FIG. 1 rolled into a tubular form for shipping.

FIG. 4 shows the material movement apparatus 10 rolled up into a tubular form. This feature is a significant element of the invention that enables it to ship easily, inexpensively and directly as opposed to rigid prior art devices. In this regard, Applicants have determined that the preferred material for the apparatus is an Ultra High Molecular Weight Polyethylene ("UHMW) or a Reprocessed Ultra High Molecular Weight Polyethylene ("Repro-UHMW"). Likewise, High Density Polyethylene ("HDPE") or Reprocessed High Density Polyethylene ("Repro-HDPE) has been found to be suitable for the purposes of the invention. These materials are preferred due to their strength, flexibility and very low coefficient of friction.

By way of further description, the present invention includes structure and materials that lower the coefficient of friction to make it easier to glide, reduces weight making it easier to transport/maneuver and increases flexibility, giving it the ability to roll for shipping and storage. This eliminates the need for Light Truck Load ("LTL") freight, and can be shipped via traditional ground transportation)

Tarps have been used by many people, for many years to transport materials. The present invention improves on the tarp transport method by providing:
1. Lower coefficient of friction.
2. More durable material won't rip and shred like a tarp.
3. Longer lasting.
4. Including an integrated pull bar that, among other things, allows for the transport of much heavier materials than a tarp.
5. Enables material to be raked directly onto the apparatus, without it folding and crumpling like a tarp.

With regard to carts with wheels, wheelbarrows, and trailers, the present invention:
1. Is much less expensive than most trailers.
2. Holds more weight than most carts and wheelbarrows, because there is no axle and tires to create a weight limitation.
3. Is easier to load at ground level instead of having to lift into a cart and over sides.
4. Material can be raked directly onto the present invention without having to pile and lift.
5. Stores in less space.
6. No assembly required.
7. Ships for less money because it is smaller and lighter.
8. Holds more material than most carts With regard to plastic devices, almost everyone building any type of dragging device with plastic, is using metal grommets, or the like, in the plastic as pull points. The grommets provide some strength and some resistance against tearing, but not much. The problem is that the pulling force is working against the material instead of with it.

By contrast, the present invention creates a curved section, preferably by heating the plastic to form it around the pull bar, which does several things. The heating process makes the heated portion more rigid and stronger and forms the curved section. By locating the pull bar on the top within the curved section, when pulling force is applied from the top to the bottom at the pull point(s), the pull bar spreads out the load applied to the material support, along the full width of the material support.

The description of the present embodiments of the invention has been for purposes of illustration, but is not intended to be exhaustive or to limit the invention to the form disclosed. Many modifications and variations will be apparent to those of ordinary skill in the art. As such, while the present invention has been disclosed in connection with an embodiment thereof, it should be understood that other embodiments may fall within the spirit and scope of the invention as defined by the following claims.

What is claimed is:

1. A material movement apparatus comprising:
   a. a material support with a front, a rear, a first side, a second side, a top and a bottom wherein the front includes a curved section that curves up from the bottom from the first side to the second side;
   b. a pull bar connected with the top at the front within the front curved section;
   c. a pull point connected with the pull bar from the bottom;
   d. a handle in a side; and
   e. a second pull bar where the rear includes a rear curved section that curves up from the bottom from the first side to the second side and the second pull bar is connected with the top at the rear within the rear curved section.

2. The apparatus of claim 1 wherein the pull point is an eyebolt connected with the pull bar from the bottom.

3. The apparatus of claim 2 further including more than one eyebolt connected with the pull bar from the bottom.

4. The apparatus of claim 1 wherein the handle is a cuttout in the side of the material.

5. The apparatus of claim 1 wherein there is a handle in the first side and a handle in the second side.

6. The apparatus of claim 1 wherein corners formed at the connection of the first side and second side with the front and rear are rounded.

7. The apparatus of claim 1 wherein the material support includes a tie down.

8. The apparatus of claim 1 wherein the material support is a durable, low friction, flexible plastic sheet that rolls into a tubular form.

9. A material movement apparatus comprising:
a. a material support with a front, a rear, a first side, a second side, a top and a bottom wherein the front includes a curved section that curves up from the bottom from the first side to the second side and wherein corners formed at the connection of the first side and second side with the front and rear are rounded;
b. a pull bar connected with the top at the front within the front curved section wherein the poll bar extends along the front between the first side and the second side;
c. a pull point connected with the pull bar from the bottom wherein the pull point is an eyebolt connected with the pull bar from the bottom;
d. a handle in the first side and a handle in the second side; and
e. a second pull bar where the rear includes a rear curved section that curves up from the bottom than the first side to the second side and the second pull bar is connected with the top at the rear within the rear curved section.

10. The apparatus of claim 9 wherein the handle is a cuttout in the side of the material.

11. The apparatus of claim 9 wherein there is more than one handle in the first side and in the second side.

12. The apparatus of claim 9 wherein the material support includes a tie down.

13. The apparatus of claim 12 wherein there is a tie down in the first side and in the second side.

14. The apparatus of claim 9 wherein the material support is a durable, low friction, flexible plastic sheet that rolls into a compact tubular form for transport.

15. A material movement method comprising:
a. providing a material support with a front, a rear, a first side, a second side, a top and a bottom wherein the front includes a curved section that curves up from the bottom from the first side to the second side and wherein corners formed at the connection of the first side and second side with the front and rear are rounded; a pull bar connected with the top at the front within the front curved section wherein the pull bar extends along the front between the first side and the second side; a pull point connected with the pull bar from the bottom wherein the pull point is an eyebolt connected with the pull bar from the bottom and a handle in the first side and a handle in the second side; and a second pull bar where the rear includes a rear curved section that curves up from the bottom from the first side to the second side and the second pull bar is connected with the top at the rear within the rear curved section. and
b. placing the material support on the ground such that the bottom is on the ground.

16. The method of claim 15 further including loading material on the top of the material support.

17. The method of claim 15 wherein there is more than one handle in the first side and in the second side.

18. The method of claim 15 wherein the material support includes a tie down.

19. The method of claim 15 wherein there is a tie down in the first side and in the second side.

20. The method of claim 15 wherein the material support is a durable, low friction, flexible plastic sheet that rolls into a compact tubular form for transport.

* * * * *